US008898646B2

(12) United States Patent
Codina et al.

(10) Patent No.: US 8,898,646 B2
(45) Date of Patent: Nov. 25, 2014

(54) METHOD AND APPARATUS FOR FLEXIBLE, ACCURATE, AND/OR EFFICIENT CODE PROFILING

(75) Inventors: Enric Gibert Codina, Barcelona (ES); Josep M. Codina, Hospitalet de Llobregat (ES); Carlos Madriles, Barcelona (ES); Raul Martinez, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 460 days.

(21) Appl. No.: 12/976,799

(22) Filed: Dec. 22, 2010

(65) Prior Publication Data

US 2012/0167058 A1 Jun. 28, 2012

(51) Int. Cl.
*G06F 9/44* (2006.01)
*G06F 9/45* (2006.01)
*G06F 11/34* (2006.01)

(52) U.S. Cl.
CPC ........ *G06F 11/348* (2013.01); *G06F 2201/865* (2013.01); *G06F 11/3409* (2013.01); *G06F 2201/86* (2013.01); *G06F 11/3466* (2013.01)
USPC ............ 717/130; 717/131; 717/141; 717/158

(58) Field of Classification Search
CPC .......... G06F 11/3466; G06F 2201/856; G06F 11/3636; G06F 11/3612; G06F 11/348; G06F 11/3409; G06F 2201/86
See application file for complete search history.

(56) References Cited

U.S. PATENT DOCUMENTS

| | | | |
|---|---|---|---|
| 6,119,075 A * | 9/2000 | Dean et al. ..................... 702/186 |
| 6,163,840 A * | 12/2000 | Chrysos et al. ............... 712/227 |
| 6,675,372 B1 * | 1/2004 | Damron ........................ 717/130 |
| 7,137,110 B1 * | 11/2006 | Reese et al. ................... 717/158 |
| 8,286,150 B2 * | 10/2012 | Yamashita ..................... 717/141 |
| 8,336,033 B2 * | 12/2012 | Schmelter et al. ............ 717/131 |
| 2003/0018960 A1 * | 1/2003 | Hacking et al. ............... 717/158 |
| 2004/0049768 A1 * | 3/2004 | Matsuyama et al. .......... 717/141 |
| 2004/0221280 A1 * | 11/2004 | Bolton et al. ................. 717/151 |
| 2004/0268333 A1 * | 12/2004 | Wang et al. ................... 717/158 |
| 2006/0224873 A1 * | 10/2006 | McCormick et al. ......... 712/244 |
| 2007/0162897 A1 * | 7/2007 | Gerard et al. ................. 717/130 |
| 2007/0169003 A1 * | 7/2007 | Branda et al. ................. 717/130 |
| 2008/0127116 A1 * | 5/2008 | Kosche et al. ................ 717/130 |

(Continued)

OTHER PUBLICATIONS

Jingling Xue, Partial dead code elimination on predicated code regions, 2004, pp. 1656-1670.*

(Continued)

*Primary Examiner* — Thuy Dao
*Assistant Examiner* — Mongbao Nguyen
(74) *Attorney, Agent, or Firm* — Blakely, Sokoloff, Taylor & Zafman LLP

(57) ABSTRACT

An apparatus and method for profiling program code. In particular, an apparatus according to one embodiment comprises a filtering component identifying a first set of instructions for which profiling is desired wherein, in response to detecting that an instruction has been retired, the filtering component determines whether the instruction is within the first set of instructions for which profiling is desired; an event selection component detecting an event in response to the instruction retiring, the event selection component generating event signals in response to a designated event; and a profiling component recording the occurrence or not occurrence of the event within a first storage device responsive to signals from the filtering component and/or the event selection component.

16 Claims, 4 Drawing Sheets

(56) References Cited

U.S. PATENT DOCUMENTS

| | | | |
|---|---|---|---|
| 2008/0127120 A1* | 5/2008 | Kosche et al. | 717/131 |
| 2008/0148241 A1* | 6/2008 | Jones et al. | 717/130 |
| 2008/0163254 A1* | 7/2008 | Cota-Robles et al. | 719/318 |
| 2008/0177756 A1* | 7/2008 | Kosche et al. | 707/100 |
| 2008/0270997 A1* | 10/2008 | Murray et al. | 717/131 |
| 2009/0044177 A1* | 2/2009 | Bates et al. | 717/131 |
| 2009/0098805 A1* | 4/2009 | Pullichola et al. | 451/28 |
| 2009/0157359 A1* | 6/2009 | Chernoff | 702/186 |
| 2009/0204785 A1* | 8/2009 | Yates et al. | 711/205 |
| 2009/0319758 A1* | 12/2009 | Kimura | 712/220 |
| 2010/0070669 A1* | 3/2010 | Johnson et al. | 710/264 |
| 2010/0180158 A1* | 7/2010 | Corry et al. | 714/38 |
| 2010/0281471 A1* | 11/2010 | Liao et al. | 717/141 |

OTHER PUBLICATIONS

Mohammed Fadle Abdulla, An Efficient Manual Optimization for C Codes, 2010, pp. 1-5.*

J. Adam Butts, Dynamic Dead-Instruction Detection and Elimination, 2002, pp. 1-11.*

Merten, et al., "A Hardware Mechanism for Dynamic Extraction and Relayout of Program Hot Spots" ISCA 2000, pp. 59-70.

* cited by examiner

METHOD AND APPARATUS FOR FLEXIBLE, ACCURATE, AND/OR EFFICIENT CODE PROFILING

BACKGROUND

1. Field of the Invention

This invention relates generally to the field of computer processors. More particularly, the invention relates to an apparatus and method for flexible, accurate, and/or efficient code profiling.

2. Description of the Related Art

Program code "profiling" is a form of dynamic program analysis which gathers information as a program executes. Profiling may be used, for example, to determine the execution time of certain program functions as part of a debugging process. "Sampling" is a form of program code profiling in which the sampling profiler probes a target program's program counter at periodic intervals (e.g., using operating system interrupts). "Instrumentation" is yet another form of program code profiling in which additional instructions are added to existing program code to collect the necessary information.

One problem which exists is that current profiling techniques affect the operation of the underlying program code, typically reducing performance and resulting in inaccurate results. For example, if additional profiling instructions are used, the extra overhead resulting from the profiling instructions implies that either: (i) simple profiling models are used, or (ii) profiling is only performed during a very small time window. These two solutions sacrifice profiling accuracy in order to reduce the costs to obtain profile information. In addition, in this case, the extra instructions may have collateral effects on the events being profiled, yielding imprecise profile data. In fact, most systems today only profile the execution frequency of basic blocks and branch destinations. However, numerous event types could potentially be profiled to leverage sophisticated optimizations (e.g., L1 cache misses, branch mis-predictions, translation lookaside buffer (TLB) misses, etc). The problem with current hardware support to gather this information is that it does not associate accurately the occurrences of events and the ratios of occurrences/not occurrences of such events with individual instructions.

Several processors already include some sampling mechanisms in order to collect profiling information. In these cases, the user can specify a software service routine to be invoked when certain execution characteristics are met. In a typical usage scenario, the user programs a routine to be invoked periodically every, for example, 100,000 retired instructions. The routine then accesses a hardware structure in which the addresses of the last N taken branches are recorded. The routine reads them out and accumulates them in memory. The value for 'N' is a hardware implementation parameter and it is normally quite small (e.g., 4). Moreover, with such kind of profiling schemes it is not possible to obtain the ratio between the number of occurrences (taken) and not occurrences (not taken) for a given instruction/event pair (e.g., a conditional branch retired), as the hardware only records the last N occurrences and does not record "not" occurrences. If it did, the routine would need to be invoked very frequently (every N conditional branch instructions if possible), resulting in significant overhead. Furthermore, these schemes do not offer the option of specifying a filtering address range to identify certain portions of program code for profiling. Hence, the obtained profile information may belong to any instruction, and potentially to instructions which do not require optimization.

Current processors also provide interfaces to monitor the behavior of an application. However, in these implementations, profiling information is obtained at a coarse grain and merely identifies whether a small or large amount of the desired events occurred. Once again, using these techniques, it is not possible to obtain the ratio between occurrences and not occurrences of such events with individual instructions.

In summary, there is currently no simple, flexible and inexpensive mechanism to obtain accurate profiling information.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

In one embodiment of the invention, hardware support is provided to perform accurate profiling in a more hardware/software collaborative manner. In this embodiment, the intelligence to determine what and when to profile is performed in software and the collection of accurate profile information (e.g., associating events and the ratios of occurrences/not occurrences to individual instructions) is performed by hardware, incurring no additional overhead.

As described in detail below, in one embodiment, the hardware component is a relatively small and simple structure which associates the occurrences and not occurrences of some programmed events with individual instructions. This structure may be from 4 to 16 entries large. It should be noted, however, that the underlying principles are not limited to such a structure or to any specific number of entries.

In one embodiment, the software component is responsible for determining what and how to profile. The software may apply heuristics to determine events to profile and for which instructions. Furthermore, the software of this embodiment may extend the hardware structure by reading information from it regularly and updating a similar software structure held in memory with the accumulated information. The hardware component of one embodiment provides an interface to allow the interaction with the software component, as described in greater detail below.

Figure 1:
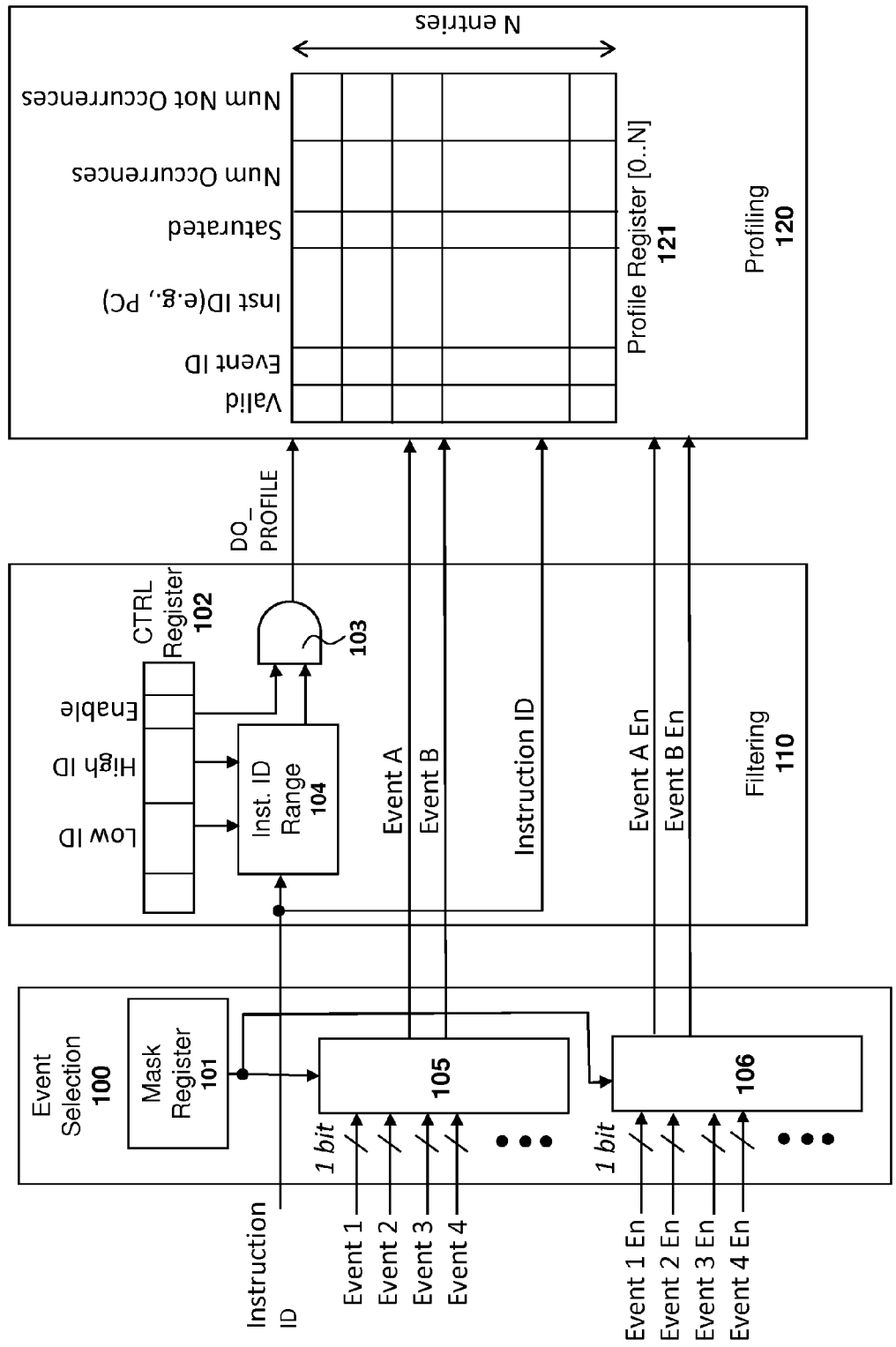
FIG. 1 illustrates one embodiment of an apparatus for performing profiling operations.

As illustrated in FIG. 1, one embodiment of the hardware component includes an event selection component 100, a filtering component 110, and a profiling component 120. The event selection component 100 receives several 1-bit event signals (shown as "Events 1-4"), several 1-bit Event Enable signals (shown as "Event 1-4 En"), and an instruction identifier (ID) which identifies the retiring instruction associated with the aforementioned event signals. By way of example, and not limitation, "Event 1" may be an L1 cache hit/miss indicator (e.g., where a one indicates that an L1 cache miss occurred while a zero indicates that an L1 cache hit occurred) and the signal "Event 1 En" may indicate whether an L1 hit/miss can occur for that particular instruction. For example, the enable signal may be set to one for loads and stores and set to zero for arithmetic operations, branch instructions, and other operations unrelated to an L1 cache hit/miss. By way of example, and not limitation, FIG. 1 assumes a single retiring instruction at a time. The extensions to accommodate more retiring instructions are straight forward to one skilled in the art that the invention may be practiced.

In one embodiment, the event selection component 100 includes a mask register 101 in which software selects events to profile. The output from the mask register 101 controls event derivation blocks 105 and 106 which, in response, generate event signals for the profiling component 120. In one embodiment, the event derivation blocks 105, 106 are multiplexers; however, the underlying principles of the invention are not limited to any particular logical structure. In the example shown in FIG. 1, for the purposes of illustration, it is assumed that only two events—Event A and Event B—are profiled together, where the signals and their corresponding enabling signals are derived from the incoming 1-bit Event and Event Enable signals, respectively. The more events to profile at the same time, the more contention there will be in the hardware structure and the more write ports may be needed.

In one embodiment, the filtering component 110 is configured by a control register 102. Profiling may be enabled or disabled by properly setting an Enable bit in this register (e.g., with software). In addition, an instruction ID range such as a program counter (PC) address range may be specified to profile within the control register, identified with a low instruction ID value (e.g., a low address value) and high instruction ID value (e.g., a high address value), as indicated in FIG. 1. An instruction ID range filtering block 104 receives the instruction ID (e.g., the current program counter address) and the low and high instruction IDs from the control register 102 and responsively generates a binary signal to indicate whether the current instruction ID falls within the designated range. While one embodiment of the invention uses the program counter address as the instruction ID and program counter address ranges as instruction ID ranges, the underlying principles of the invention are not limited to the use of program counter addresses for instruction IDs. Other forms of instruction ID codes may be used while still complying with the underlying principles of the invention. In the specific implementation shown in FIG. 1, the binary output from the address range filtering block 104 and the binary enable signal from the control register are provided to an AND gate 103 which responsively provides a binary enable/disable signal to the profiling component 120. Of course, various logical structures may be used in lieu of an AND gate while still complying with the underlying principles of the invention (e.g., a NAND gate). As a result of the instruction ID range filtering, all instructions belonging to the specified address range may be profiled by the profiling component 120. This scheme, in which only a subset of the instructions are profiled at a given point in time, is beneficial, as compilers and/or binary translators focus their optimizations to individual sections of code one at a time. This provides for a relatively small hardware structure which may be extended by software if needed.

In one embodiment, the profiling component 120 includes a profile register 121 with N entries used to retain profiling information. It has been determined that a structure with a relatively small number of entries (e.g., between 4 and 16) is sufficient to capture accurate profiling information. The number of entries and the read/write ports required may dictate the associativity of the structure.

In one embodiment, each entry within the profile register 121 has the following fields:
A Valid bit which indicates whether or not the entry is valid.
An Event ID field to distinguish the event being profiled by the entry. In FIG. 1, where only two events are tracked at the same time (Event A and Event B), this field would be 1 bit long. If only one event is tracked at the same time, this field would not be necessary.
Instruction ID field bits to uniquely identify the instruction. In one embodiment, this takes the form of the program counter of the instruction.
A Saturated bit to indicate whether any of the two next counters is saturated.
A Number of Occurrences field which, in one embodiment, is a counter that counts how many times the event being profiled by the entry occurred.
A Number of "Not Occurrences" which, in one embodiment, is a counter that counts how many times the event being profiled by the entry did not occur.

It has been determined that 15-bit counters are sufficient to accurately capture the ratio between the amount of times that the event occurred and the amount of times it did not occur. However, the final particular applicability of this invention requires an analysis to set up an appropriate counter size in order to find the better trade-off between hardware complexity and profiling accuracy.

Figure 2:
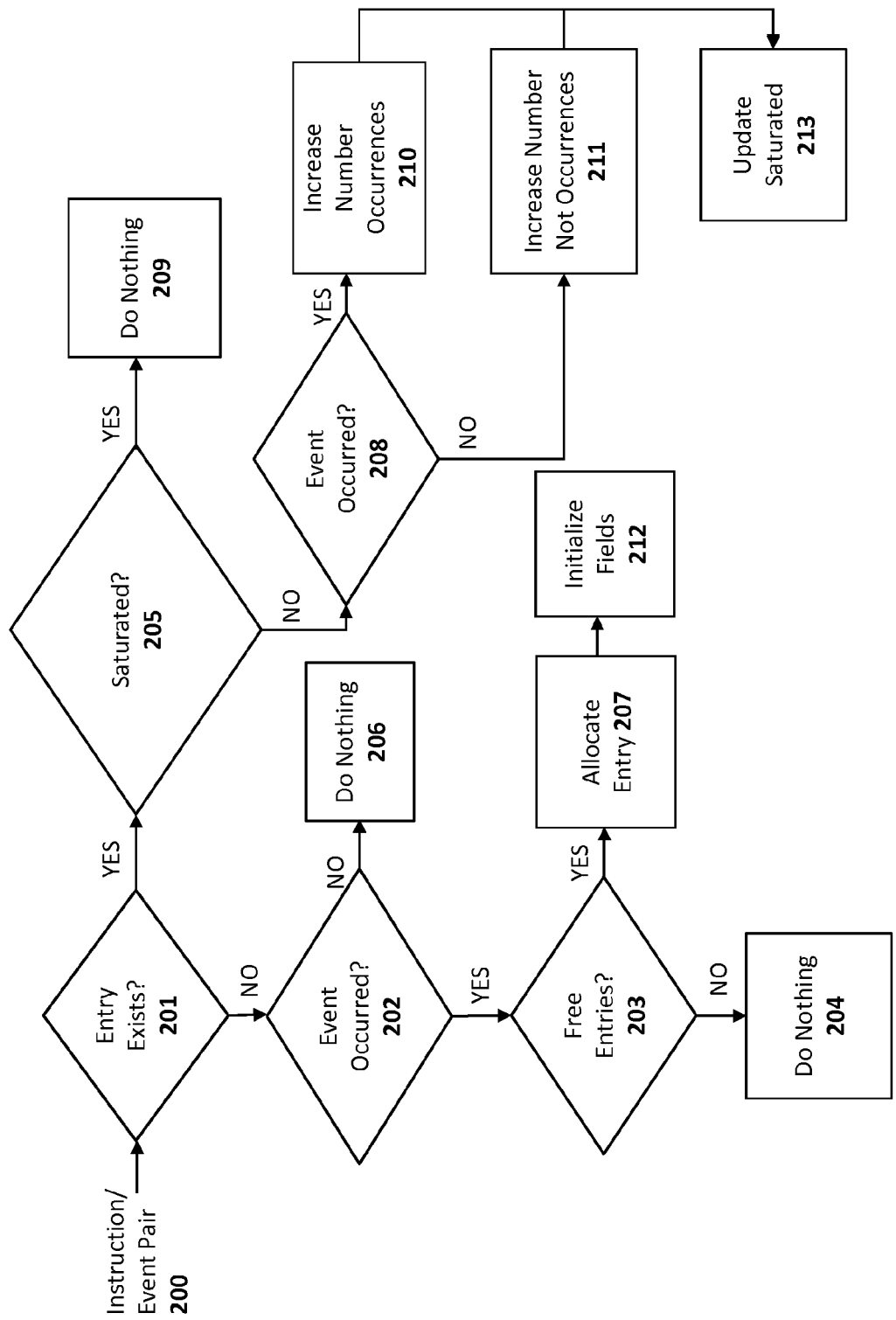
FIG. 2 illustrates one embodiment of a method for performing profiling operations.

One embodiment of the profiling component 120 operates according to the method shown in FIG. 2. At 201, when an instruction/event pair (e.g., an instruction ID and Event A pair in FIG. 1) is to be profiled (e.g., when the DO_PROFILE and the Event A En signals in FIG. 1 are set) one embodiment of the profiling component 120 first checks whether any of the entries in the profile register 121 match. In one embodiment, a "match" means that the instruction ID and event ID are found in an existing entry and that the entry is marked as valid. If so, then at 205, the "saturated" bit is checked. A one indicates that one of the counters already reached the maximum value and, in order not to overflow it and maintain the correct ratio of number of occurrences versus number of "not occurrences" up to that point, that entry is frozen. In such a case, at 209 nothing is counted regardless of which counter saturated.

However, if the saturated bit is clear, in one embodiment, the corresponding counter is increased. Specifically, if the corresponding event signal is set (e.g. Event A signal in FIG. 1), determined at 208, then the number of occurrences is increased by one at 210; otherwise, the number of "not occurrences" is increased by one at 211. The saturated bit is then updated at 213. In one embodiment, this is accomplished with the carry flag of the adder.

If there is no entry matching the current instruction/event pair, determined at 201, one embodiment of the invention attempts to allocate one only when an event occurred, determined at 202. Allocating only when the event occurs (which should be a relatively rare case) filters out many instruction/event pairs where the event never happens. This leaves more room for other instruction/event pairs to be profiled using limited hardware resources. By way of example, and not limitation, the program code may specify that profiling is to be performed on the hit/miss behavior of load instructions with respect to the L1 cache. In this scenario, an entry may be allocated in the presence of an L1 cache miss in order to filter out the many load instructions that never miss in the L1 cache (i.e., the "event" is defined as an L1 cache miss). At 206, if no event is detected, the process terminates and no entries are allocated/updated.

It should be noted that the "event" in the "instruction/event pair" 200 used to trigger the method in FIG. 2, refers to either an "event occurred" or an "event not occurred" condition. For example, the same event ID may identify a cache hit or miss while the "event occurred" decision block 208 may indicate only whether a cache miss occurred. Said another way, the "event" is defined as a cache miss, but either a cache miss or a cache hit will trigger the illustrated method (e.g., using the same event ID).

In order to allocate an entry at 207, one embodiment of the invention first determines whether there is any free entry at 203 (e.g., an entry having a cleared "valid" bit). If not, this means that all entries are being used and nothing occurs at 204. In one embodiment, this means that there is no entry replacement policy built in to the apparatus shown in FIG. 1. In such a case, it is the program code that may clear the contents of the profile register 121 (e.g., by setting some or all of the valid bits to zero through write operations). It may be the case that regular replacement algorithms such as least-recently-used (LRU) and pseudo-LRU perform poorly for these kinds of profiling structures. As such, more complex replacement techniques may instead be used. One embodiment of the invention avoids complexity by not implementing a hardware replacement policy and by providing a rich software interface (as explained below).

If free entries exist, one is allocated at 207 (e.g., in first-in-first-out (FIFO) order). When an entry is allocated, the event ID and instruction ID fields are initialized to the corresponding values, the "valid" bit field is set, the "saturated" bit field is clear, the number of "not occurrences" counter is set to zero, and the number of occurrences counter is set to one.

In one embodiment, software may read and write the entries in the profiling component 120 as needed. Each entry is identified by a core special register (CSR) (Profile Registers 121 in FIG. 1), offering a rich software interface. By way of example, and not limitation, the software may read the whole structure at some point in time and accumulate the profiled information in a corresponding software structure held in memory. At that point, the software may clear the entries by setting all valid bits to zero. Alternatively, or in addition, it may reset the counters, but leave the rest of the fields as they are. In such a case, the same instruction/event pairs would be profiled for some additional time but with fewer chances to saturate the counters. Another option would be to initialize some of the entries (the valid bit and the instruction/event pair fields) and leave other entries free. This may have the effect of pre-booking some entries to specific instruction/event pairs that the software believes may be problematic, while the free entries would be allocated dynamically based on the execution of the application as explained before. A variety of different programming choices may be employed while still complying with the underlying principles of the invention. Moreover, it should be noted that the underlying principles of the invention are not limited to the specific interface options discussed above.

Some experiments were conducted to confirm the design of the apparatus and method described herein. A brief summary of the results follows.

The experiments were conducted using the Code Morphing Software. In particular, the CMS performs sampling in order to decide whether a piece of code (a translation) is utilized enough to optimize it aggressively. When the same translation has been sampled a specific number of times, it promotes it to a more aggressive optimization stage. At this point, when the translation reaches this threshold, it is profiled for 400,000 core cycles (a parameter in the simulations) and the optimizer is postponed until then.

A first experiment consisted of identifying delinquent loads (loads that miss more than 10% in the L1 cache) for the hot translations in order to apply aggressive code reordering techniques and prefetching. In this case, the selected event was an L1 cache miss, i.e., allocation only happened when an instruction missed in the L1 cache, thereby filtering out the many instructions that never miss the L1 cache. Using more than 500 simulation points belonging to SPEC 2000 benchmarks, Dacapo benchmarks (Java programs), High Definition Video benchmarks, and Physicbench (physics benchmarks), it was observed that the error for detecting delinquent loads was only 0.4% with an 8 entry 4-way set associative hardware structure with 15-bit counters.

Another experiment consisted on capturing the precise taken/fallthru ratio of conditional branches in order to apply aggressive code reordering techniques and converting biased branches into assert operations. In this case, the selected event was a taken conditional branch. Hence, allocation only occurred when a conditional branch was taken, thereby filtering out many conditional branches that never branch. Using more than 500 simulation points belonging to SPEC 2000 benchmarks, Dacapo benchmarks (Java programs), High Definition Video benchmarks, and Physicbench (physics benchmarks), it was observed that the error for computing the taken ratio for conditional branches was only 3% with an 8 entry 4-way set associative hardware structure with 15-bit counters.

The techniques described above exploit hardware support to perform flexible, accurate, and/or efficient code profiling in a hardware/software collaborative manner. These techniques can be useful for various different applications including, but not limited to Co-designed Virtual Machines, such as Transmeta Efficeon machines or IBM's BOA project designs. With these implementations, a software layer (Code Morphing Software) emulates, translates and optimizes guest instructions (x86 or PowerPC) on top of a simple very-long instruction word (VLIW) hardware design.

These techniques may also be used with just-in-time (JIT) compilers such as Java Virtual machines or the Microsoft Common Language Runtime (CLR) virtual machine. In such systems, a software layer emulates and optimizes instructions from a standard instruction set architecture (ISA) (e.g., bytecode) to the native ISA that the virtual machine is running on. The same reasoning applies to other kinds of JIT compilers such as IA-32 EL, an Intel product designed to execute IA-32 binaries on top of an Itanium Processor Family (IPF) machine.

In addition, the techniques described above may be implemented with standard compilers such as the GNU Compiler Collection ("gcc"). In these cases, profile-guided optimizations may be used to generate more compact and efficient binaries.

Figure 3:
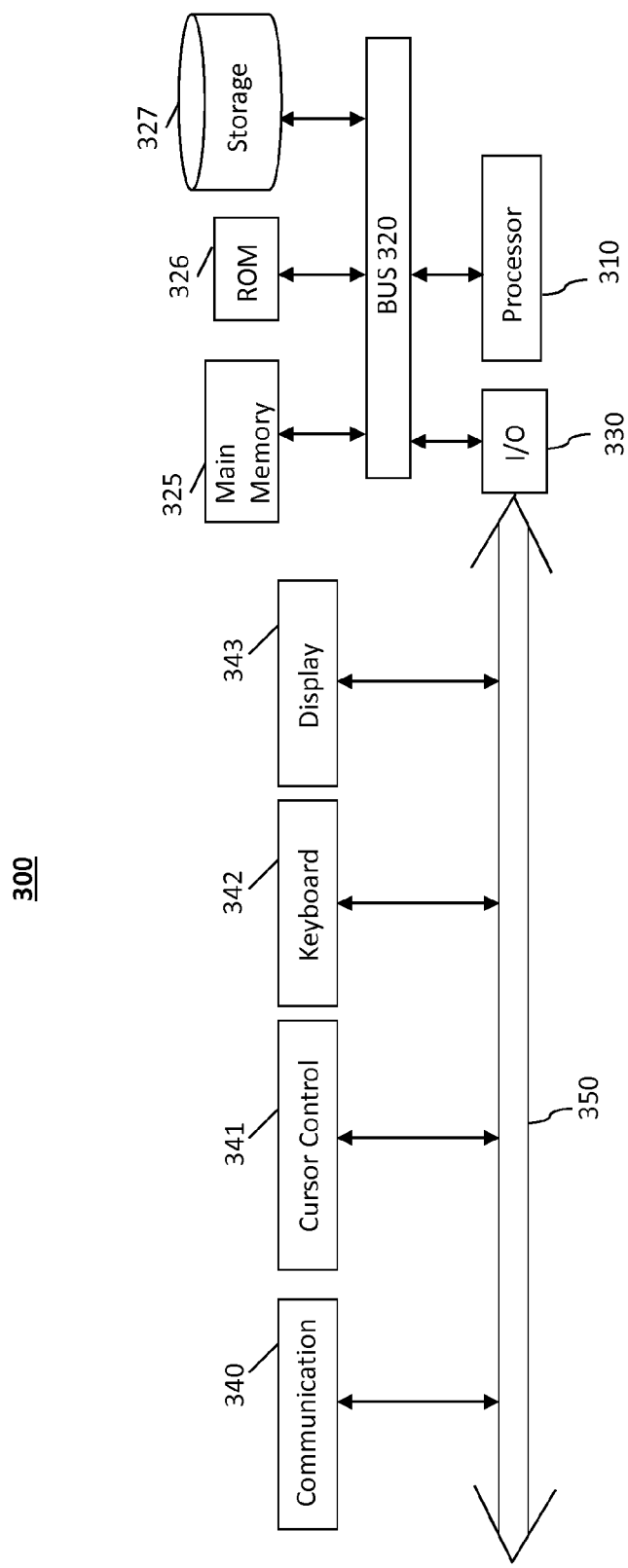
FIG. 3 illustrates an exemplary computer system on which embodiments of the invention may be implemented.

FIG. 3 illustrates an exemplary computer system 300 upon which embodiments of the invention may be implemented. The computer system 300 comprises a system bus 320 for communicating information, and a processor 310 coupled to bus 320 for processing information. Computer system 300 further comprises a random access memory (RAM) or other dynamic storage device 325 (referred to herein as main memory), coupled to bus 320 for storing information and instructions to be executed by processor 310. Main memory 325 also may be used for storing temporary variables or other intermediate information during execution of instructions by processor 310. Computer system 300 also may include a read only memory (ROM) and/or other static storage device 326 coupled to bus 320 for storing static information and instructions used by processor 310.

A data storage device 327 such as a magnetic disk or optical disc and its corresponding drive may also be coupled to computer system 300 for storing information and instructions. The computer system 300 can also be coupled to a second I/O bus 350 via an I/O interface 330. A plurality of I/O devices may be coupled to I/O bus 350, including a display device 343, an input device (e.g., an alphanumeric input device 342 and/or a cursor control device 841).

The communication device 340 is used for accessing other computers (servers or clients) via a network, and uploading/downloading various types of data. The communication device 340 may comprise a modem, a network interface card, or other well known interface device, such as those used for coupling to Ethernet, token ring, or other types of networks.

Figure 4:
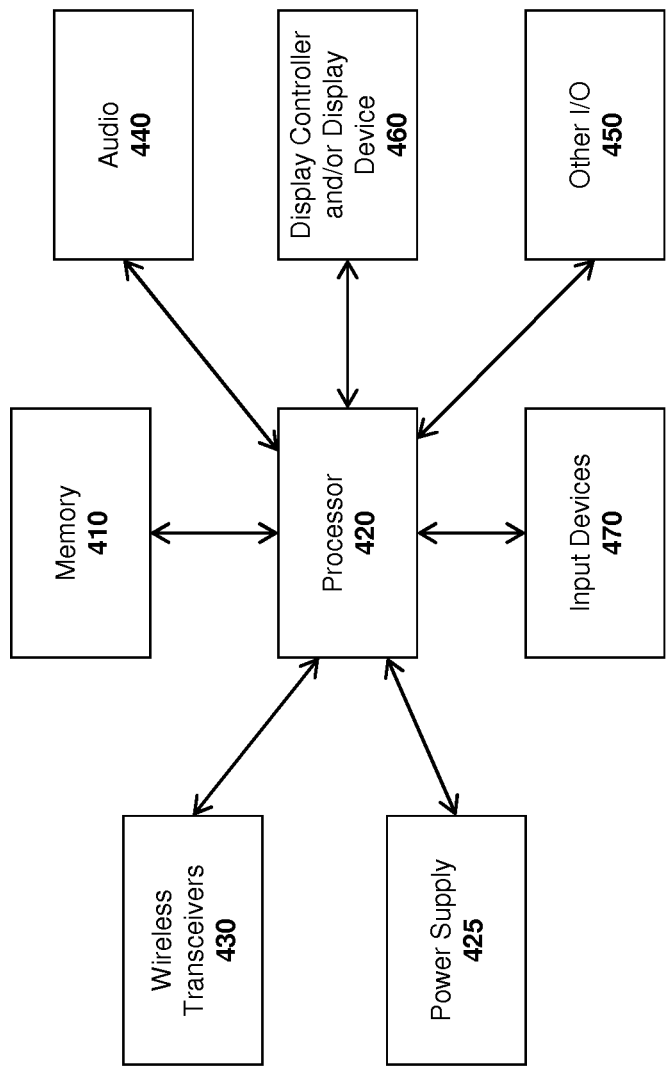
FIG. 4 illustrates another exemplary computer system on which embodiments of the invention may be implemented.

FIG. 4 is a block diagram illustrating another exemplary data processing system which may be used in some embodiments of the invention. The data processing system 400 may be, for example, a handheld or laptop computer, a personal digital assistant (PDA), a mobile telephone, a portable gaming system, a portable media player, a tablet or a handheld computing device which may include a mobile telephone, a media player, and/or a gaming system. As another example, the data processing system 400 may be a network computer or an embedded processing device within another device.

According to one embodiment of the invention, the exemplary architecture of the data processing system 400 may used for the mobile devices described above. The data processing system 400 includes the processing system 420, which may include one or more microprocessors and/or a system on an integrated circuit. The processing system 420 is coupled with a memory 410, a power supply 425 (which includes one or more batteries) an audio input/output 440, a display controller and display device 460, optional input/output 450, input device(s) 470, and wireless transceiver(s) 430. It will be appreciated that additional components, not shown in FIG. 4, may also be a part of the data processing system 400 in certain embodiments of the invention, and in certain embodiments of the invention fewer components than shown in FIG. 4 may be used. In addition, it will be appreciated that one or more buses, not shown in FIG. 4, may be used to interconnect the various components as is well known in the art.

The memory 410 may store data and/or programs for execution by the data processing system 400. The audio input/output 940 may include a microphone and/or a speaker to, for example, play music and/or provide telephony functionality through the speaker and microphone. The display controller and display device 460 may include a graphical user interface (GUI). The wireless (e.g., RF) transceivers 430 (e.g., a WiFi transceiver, an infrared transceiver, a Bluetooth transceiver, a wireless cellular telephony transceiver, etc.) may be used to communicate with other data processing systems. The one or more input devices 470 allow a user to provide input to the system. These input devices may be a keypad, keyboard, touch panel, multi touch panel, etc. The optional other input/output 450 may be a connector for a dock.

Other embodiments of the invention may be implemented on cellular phones and pagers (e.g., in which the software is embedded in a microchip), handheld computing devices (e.g., personal digital assistants, smartphones), and/or touch-tone telephones. It should be noted, however, that the underlying principles of the invention are not limited to any particular type of communication device or communication medium.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A machine-implemented method for profiling program code comprising:

identifying a first set of the instructions for which profiling is desired, wherein the first set of the instructions comprises a subset of all instructions, and wherein identifying the first set of the instructions comprises specifying a particular address range and identifying instructions within the address range as being instructions for which profiling is desired;

associating profiling events with each of the first set of instructions;

receiving an indication that an instruction has been retired;

determining whether the instruction is within the first set of instructions for which profiling is desired; and if the instruction is within the first set, then determining whether a designated event associated with the instruction has occurred or not occurred; and recording the occurrence or not occurrence of the event within a first storage device upon an indication indicating the first storage device is not saturated, wherein the first storage device is a register having an entry for each of a plurality of instruction and event pairs, each entry recording a number of occurrences and a number of not occurrence of a particular event for a particular instruction.

2. The method as in claim 1 wherein the range is specified using a low address value and a high address value.

3. The method as in claim 2 wherein the instruction is identified as falling within the range based on a program counter value associated with the instruction.

4. The method as in claim 1 wherein the occurrence or not occurrence of the event is identified using a particular event identifier (ID) code.

5. The method as in claim 1 wherein the storage device comprises a profile register having N entries, each of the entries identifying an instruction and event pair using an instruction ID and an event ID.

6. The method as in claim 1 wherein specifying the address range comprises programming a control register with a low address value and a high address value, the control register being used to filter out instructions falling outside of the range defined by the low address value and the high address value.

7. The method as in claim 1 further comprising: reading one or more entries from the register into a main memory or another storage device; and
invalidating the one or more entries in the register following the reading of the entries into main memory or another storage device; and
reading or writing any individual field/entry from the register to provide flexibility and configurability.

8. An apparatus implemented at least partially in hardware processor for profiling program code comprising:
a filtering component identifying a first set of instructions for which profiling is desired wherein, in response to detecting that an instruction has been retired, wherein the first set of the instructions comprises a subset of all instructions, wherein each of the first set of instructions is associated with profiling events, wherein the filtering component determines whether the instruction is within the first set of instructions for which profiling is desired, and wherein identifying the first set of the instructions comprises specifying a particular address range and identifying instructions within the address range as being instructions for which profiling is desired;
an event selection component detecting an event in response to the instruction retiring, the event selection component generating event signals in response to a designated event; and
a profiling component recording the occurrence or not occurrence of the event within a first storage device responsive to signals from the filtering component and/or the event selection component upon an indication indicating the first storage device is not saturated, wherein the first storage device is a register having an entry for each of a plurality of instruction and event pairs, each entry recording a number of occurrences and a number of not occurrence of a particular event for a particular instruction.

9. The apparatus as in claim 8 wherein the range is specified using a low address value and a high address value.

10. The apparatus as in claim 9 wherein the instruction is identified as falling within the range based on a program counter value associated with the instruction.

11. The apparatus as in claim 8 wherein the occurrence / not occurrence of the event is identified using a particular event identifier (ID) code.

12. The apparatus as in claim 8 wherein the storage device comprises a profile register having N entries, each of the entries identifying an instruction and event pair using an instruction ID and an event ID.

13. The apparatus as in claim 8 wherein specifying the address range comprises programming a control register with a low address value and a high address value, the control register being used to filter out instructions falling outside of the range defined by the low address value and the high address value.

14. The apparatus as in claim 8 further comprising:
an interface to read one or more entries from the register into a main memory or another storage device; and invalidate the one or more entries in the register following the reading of the entries into main memory or another storage device; and
reading or writing any individual field/entry from the register to provide flexibility and configurability.

15. The apparatus as in claim 8 wherein the filtering component, event selection component and profiling component are all implemented as logic within a single semiconductor chip.

16. A computer system comprising:
a display device;
a memory for storing instructions;
a processor for processing the instructions; and
an apparatus for profiling program code implemented at least partially in hardware processor comprising:
a filtering component identifying a first set of instructions for which profiling is desired wherein, in response to detecting that an instruction has been retired, wherein the first set of the instructions comprises a subset of all instructions, wherein each of the first set of instructions is associated with profiling events, wherein the filtering component determines whether the instruction is within the first set of instructions for which profiling is desired, and wherein identifying the first set of the instructions comprises specifying a particular address range and identifying instructions within the address range as being instructions for which profiling is desired;
an event selection component detecting an event in response to the instruction retiring, the event selection component generating event signals in response to a designated event; and
a profiling component recording the occurrence or not occurrence of the event within a first storage device responsive to signals from the filtering component and/or the event selection component upon an indication indicating the first storage device is not saturated, wherein the first storage device is a register having an entry for each of a plurality of instruction and event pairs, each entry recording a number of occurrences and a number of not occurrence of a particular event for a particular instruction.

* * * * *